United States Patent [19]
Yoshida et al.

[11] Patent Number: 5,267,163
[45] Date of Patent: Nov. 30, 1993

[54] METHOD FOR DETECTING BLENDING RATIO OF MIXED FUEL TO BE SUPPLIED TO COMBUSTION CHAMBER OF INTERNAL COMBINED ENGINE

[75] Inventors: Masato Yoshida, Kyoto; Takanao Yokoyama, Nagaokakyo; Muneyoshi Nanba, Kyoto; Yoshihiko Kato, Kyoto; Kazumasa Iida, Kyoto; Katsuhiko Miyamoto, Kyoto, all of Japan

[73] Assignee: Mitsubishi Jidosha Kogyo Kabushiki Kaisha, Tokyo, Japan

[21] Appl. No.: 647,043

[22] Filed: Jan. 29, 1991

[30] Foreign Application Priority Data

Feb. 2, 1990 [JP] Japan ............... 2-23758

[51] Int. Cl.$^5$ ............... F02M 51/00
[52] U.S. Cl. ............... 364/431.05; 123/1 A; 123/494
[58] Field of Search ............... 364/431.03, 431.05, 364/431.04, 431.1, 431.11; 123/1 A, 494

[56] References Cited

U.S. PATENT DOCUMENTS

| | | | |
|---|---|---|---|
| 4,909,225 | 3/1990 | Gonze et al. | 123/1 A |
| 4,945,881 | 8/1990 | Gonze et al. | 123/1 A |
| 4,967,714 | 11/1990 | Inoue | 123/1 A |

Primary Examiner—Jack B. Harvey
Assistant Examiner—Edward Pipala
Attorney, Agent, or Firm—Frishauf, Holtz, Goodman & Woodward

[57] ABSTRACT

A method includes a step of calculating an estimated blending ratio of a mixed fuel supplied to a combustion chamber of an internal combustion engine and a following equation is effected in this step to derive the estimated blending ratio:

$$B(t) = k*B(t-1) + (1-k)*Bs(t-n)$$

where t is an integer,
n is a first delay coefficient set according to an operation parameter and a type of the engine,
$B(t-1)$ is an estimated blending ratio derived in the preceding cycle,
$Bs(t-n)$ is a blending ratio obtained by use of said blending ratio sensor in a cycle which was effected n cycles before the current cycle, and
k is a second delay coefficient set according to a operation parameter and the type of the engine.

8 Claims, 6 Drawing Sheets

METHOD FOR DETECTING BLENDING RATIO OF MIXED FUEL TO BE SUPPLIED TO COMBUSTION CHAMBER OF INTERNAL COMBINED ENGINE

BACKGROUND OF THE INVENTION

1. Field of the Invention

This invention relates to a method for detecting the blending ratio of mixed fuel obtained by mixing different kinds of fuels when the mixed fuel is supplied to the combustion chamber of an internal combustion engine.

2. Description of the Related Art

Since the combustion gas produced when methanol is perfectly burned contains only a small amount of harmful substances, methanol has received much attention as a fuel for automobiles. That is, when methanol is used as a fuel for automobiles, it is an advantage that environmental pollution due to the exhaust gas of the automobiles can be prevented. Thus, methanol is excellent as a fuel for automobiles and therefore a methanol engine using methanol as the fuel has been developed.

However, it is practically impossible to instantly change the fuel of all automobiles from gasoline to methanol. Therefore, even in a case where the fuel of the automobile is completely changed from gasoline to methanol, there may be a situation in which gasoline is used as the fuel of the automobile as well as methanol in a transition period.

In such a situation in which different kinds of fuels are used at the same time as the fuel of the automobile, it is required to develop an engine which can use gasoline, methanol and mixed fuel obtained by mixing gasoline and methanol as the fuel thereof.

In such an engine, it is impossible that control variables such as an ignition timing of the mixed gas (mixture of the mixed fuel and air) in the combustion chamber and an amount of mixed fuel injected into the combustion chamber from the fuel injector exactly coincide with desired target values, respectively, unless the blending ratio of the mixed fuel to be injected into the combustion chamber, that is, the mixing ratio of gasoline and methanol, is correctly detected.

In order to detect the blending ratio of the mixed fuel, two detection methods are provided, for example. One of the detection methods is to indirectly detect the blending ratio of the mixed fuel by use of an oxygen sensor. The oxygen sensor is used to detect the concentration of oxygen contained in the exhaust gas of the engine. Therefore, an air/fuel ratio of the mixture supplied to the combustion chamber can be detected based on an output signal of the oxygen sensor. Thus, the blending ratio of the mixed fuel can be indirectly obtained by learning a blending ratio of the mixed fuel estimated from the value of the detected air/fuel ratio based on the feedback control.

However, the oxygen sensor has a property that the value of the output signal thereof cannot be correctly obtained until the operating condition of the engine becomes stable. For this reason, with the method using the oxygen sensor, the blending ratio of the mixed fuel cannot be detected on a real time basis.

On the other hand, the other detection method uses a blending ratio sensor and the blending ratio sensor can directly detect the blending ratio of the mixed fuel to be supplied to the combustion chamber. Therefore, the method using the blending ratio sensor is advantageous over the method using the oxygen sensor in that the blending ratio of the mixed fuel can be detected on a real time basis. However, the blending ratio sensor detects the blending ratio of the mixed fuel flowing through the blending ratio sensor on a real time basis, but does not detect the blending ratio of the mixed fuel injected from the fuel injector on a real time basis. Therefore, an error may occur between the blending ratio of the mixed fuel derived from the output signal of the blending ratio sensor and the blending ratio of the mixed fuel actually injected from the fuel injector.

SUMMARY OF THE INVENTION

An object of this invention is to provide a method capable of correctly detecting the blending ratio of the mixed fuel to be supplied to the combustion chamber of the internal combustion engine and enhancing the response characteristic of detection.

The above object can be attained by a method of this invention which comprises a step of calculating an estimated blending ratio $B(t)$ of the mixed fuel to be supplied to the combustion chamber of an internal combustion engine and the step is effected according to the following equation.

$$B(t) = k^*B(t-1) + (1-k)^*Bs(t)$$

where t is an integer, $B(t-1)$ is an estimated blending ratio derived in the preceding cycle, $Bs(t)$ is a blending ratio obtained by use of the blending ratio sensor in the current cycle, and k is a delay coefficient set according to type and operating parameters of the internal combustion engine.

In a case where the blending ratio sensor is disposed in position apart from the combustion chamber of the internal combustion engine, it is preferable to derive the estimated blending ratio $B(t)$ not from the former equation but from the following equation.

$$B(t) = k^*B(t-1) + (1-k)^*Bs(t-n)$$

where n is a first delay coefficient set according to type and operating parameters of the internal combustion engine. $B(t-1)$ is an estimated blending ratio derived in the preceding cycle, $Bs(t)$ is a blending ratio obtained by use of the blending ratio sensor in the current cycle, and k is a second delay coefficient set according to type and operating parameters of the internal combustion engine.

According to the above two equations, the estimated blending ratio $B(t)$ obtained in the current cycle is derived by adding the blending ratio $B(t-1)$ obtained in the preceding cycle and the blending ratio $Bs(t)$ obtained by the use of the blending ratio sensor to each other at a rate determined by the preset delay coefficient. Thus, the estimated blending ratio $B(t)$ correctly indicates the actual blending ratio of the mixed fuel to be supplied to the combustion chamber of the engine on a real time basis by repeatedly calculating the estimated blending ratio $B(t)$ by a larger number of times.

On the other hand, in a case where the blending ratio sensor is arranged in a position apart from the combustion chamber, the blending ratio $Bs(t-n)$, obtained from the blending ratio sensor in a cycle which was effected n cycles before the current cycle, is used instead of the blending ratio $Bs(t)$ obtained in the current cycle from the blending ratio sensor to derive the estimated blending ratio $B(t)$ of the current cycle. The estimated blending ratio $B(t)$ obtained in this manner is compensated for the delay caused by the movement of the mixed fuel due to the presence of the capacity between the blending ratio sensor and the combustion chamber. Therefore, the estimated blending ratio B(t) thus derived will correctly indicate the blending ratio of the mixed fuel actually supplied to the combustion chamber irrespective of the position of the blending ratio sensor.

The object and advantage of this invention will become more apparent from the following detailed explanation made below with reference to the accompanying drawings, but the embodiment described in the detailed explanation is only an example of this invention and will not limit the scope of this invention.

DETAILED DESCRIPTION OF THE PREFERRED EMBODIMENTS

Figure 1:
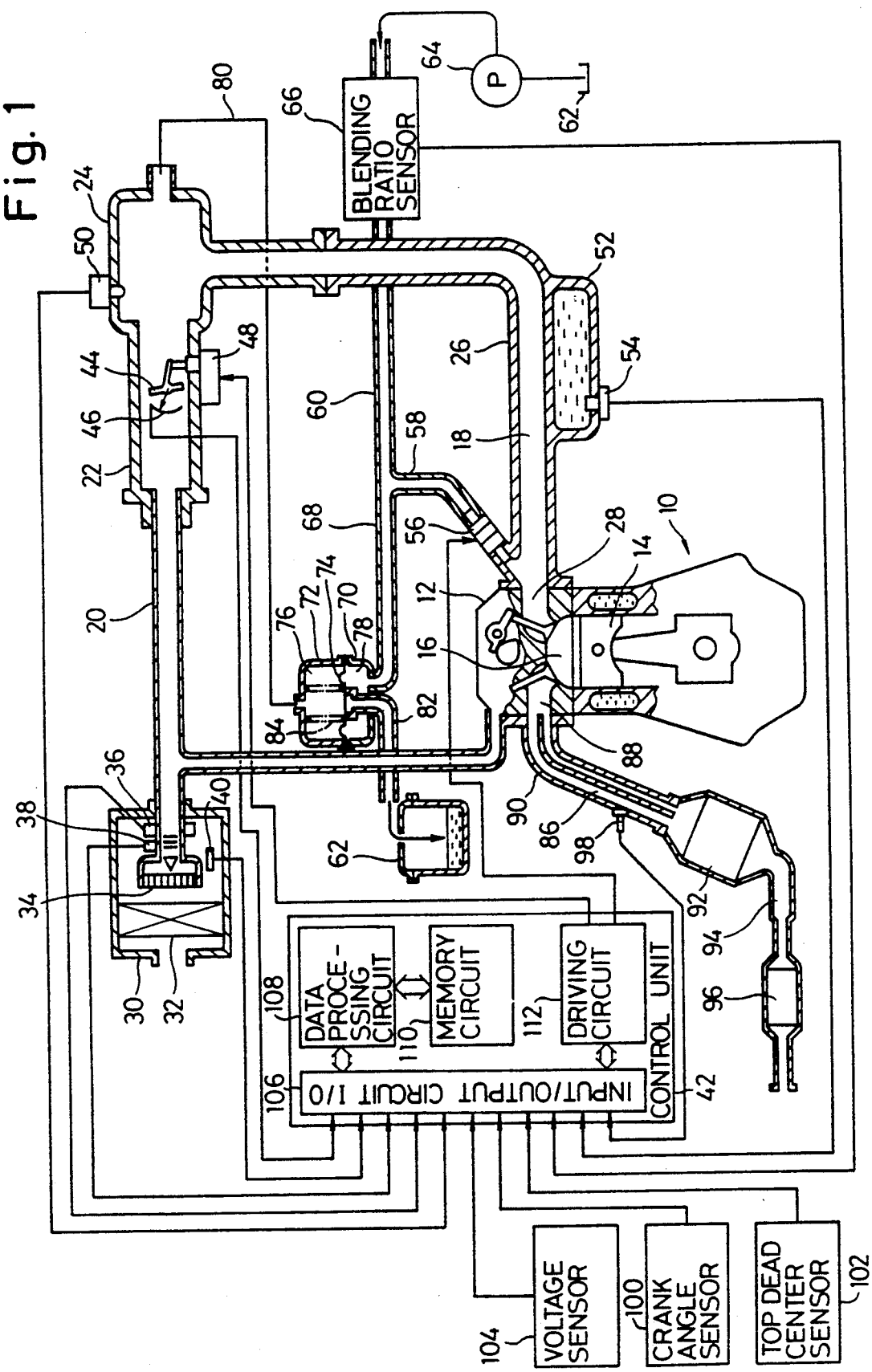
FIG. 1 is a schematic view of an internal combustion engine to which the method of this n invention is applied.

An internal combustion engine 10 is schematically shown in FIG. 1. The engine 10 is a multiple cylinder engine, but in FIG. 1, only one cylinder is shown as an example. In the engine 10, a combustion chamber 16 is defined by a cylinder head 12 and a piston 14. An intake passage 18 extends from the combustion chamber 16 and is defined in a first intake pipe 20, throttle body 22, surge tank 24, second intake pipe 26 and internal path 28 in the cylinder head 12 arranged in this order as viewed from the upstream side. In this case, the second intake pipe 26 is one of branch pipes of the intake manifold. An air cleaner 30 is mounted on the front end of the first intake pipe 20 to surround the front end thereof. In the air cleaner 30, a filter element 32 is disposed and the front end of the first intake pipe 20 faces to the filter element 32. A rectifier 34 is arranged in the front end of the first pipe 20 and a Karman's vortex type air-flow sensor 36 is arranged on the downstream side as viewed from the rectifier 34. The air-flow sensor 36 detects an amount of air flowing in the intake passage 18, that is, intake amount of the engine and outputs a detection signal.

Further, a pressure sensor 38 for detecting the atmospheric pressure and outputting a detection signal and a temperature sensor 40 for detecting the air temperature and outputting a detection signal are arranged in the air cleaner 30. Detection signals from the pressure sensor 38, temperature sensor 40 and air-flow sensor 36 are supplied to a control unit 42.

A throttle valve 44 is disposed in the throttle body 22. The throttle valve 44 is connected to an acceleration pedal via a wire so as to be opened by an angle corresponding to the depressed distance of the acceleration pedal, although not shown in the drawing. The opening of the throttle valve 44 is detected by a throttle position sensor 46 or a potentiometer and a detection signal thereof is also supplied to the control unit 42. Further, an idling speed control motor 48 is mounted on the throttle body 22 and is electrically connected to the control unit 42. The idling speed control motor 48 drives the throttle valve 44 in response to a control signal from the control unit 42 to control the idle position of the throttle valve 44, that is, the idle opening of the throttle valve 44 set while the engine 10 is kept in the idling rotating condition.

A boost sensor 50 is mounted on the surge tank 24. The boost sensor 50 detects a negative pressure in the intake passage 18, that is, intake negative pressure Pmp and outputs a detection signal to the control unit 42.

A water jacket 52 formed by use of the wall of the second intake pipe 26 is provided on part of the intake pipe 26 and a water temperature sensor 54 for detecting the temperature of water in the jacket is disposed on the water jacket 52. An output signal of the water temperature sensor 52 is also supplied to the control unit 42.

Further, a fuel injector 56 is disposed in position near the cylinder head 12 of the engine 10 in the second intake pipe 26. The fuel injector 56 includes an electromagnetic valve and is opened or closed in response to a control signal from the control unit 42. The fuel injector 56 is connected to a fuel supplying pipe 60 via a branch pipe 58. The fuel supplying pipe 60 is connected to a fuel tank 62. The mixed fuel of gasoline and methanol is stored in the fuel tank 62.

A fuel supplying pump 64 and blending ratio sensor 66 are inserted into the fuel supplying pipe 60 in this order as viewed from the fuel tank 62. The fuel supplying pump 64 supplies the mixed fuel drawn from the fuel tank 62 to the fuel supplying pipe 60 via the blending ratio sensor 66.

The blending ratio sensor 66 is a sensor developed in consideration of the fact that the index of refraction of light in the mixed fuel varies according to the blending ratio of methanol to gasoline. That is, although not shown in the drawing, the blending ratio sensor 66 includes an optical system for radiating light towards the mixed fuel and receiving part of the refracted light which has been refracted in the mixed fuel and passes through the mixed fuel according to the index of refraction in the mixed fuel and a photoelectric converting element for converting an amount of refracted light received by the optical system into an electrical signal and outputting the same. Therefore, the output signal of the photoelectric converting element indicates the index of refraction in the mixed fuel so that the blending ratio of the mixed fuel can be derived based on the output signal of the photoelectric converting element.

A pressure governing pipe 68 extends from the fuel supplying pipe 60 and is connected to a pressure regulator 70. The pressure regulator 70 has a housing 72 and the interior portion of the housing 72 is divided into a negative pressure chamber 76 and liquid chamber 78 by a bellowphragm 74. The liquid chamber 78 is connected to the pressure governing pipe 68. On the other hand, the negative pressure chamber 76 is connected to the surge tank 24 via an air pipe 80 which is indicated only by a line. One end of a return pipe 82 is disposed into the liquid chamber 78, and the other end of the return pipe 82 is connected to the fuel tank 62. Further, a compression coil spring 84 is disposed in the negative pressure chamber 76 and urges, the bellowphragm 74 by a preset force towards one end of the return pipe 82. Therefore, in the state shown in the drawing, the one end of the return pipe 82 is closed by the bellowphragm 74. However, when the pressure in the fuel supplying pipe 60, that is, the pressure of the mixed fuel in the liquid chamber 78 increases and becomes larger than the urging force of the compression coil spring 84, the bellowphragm 74 is separated from the one end of the return pipe 82, thereby causing the fuel supplying pipe 60 to be connected to the return pipe 82 via the liquid chamber 78. In this condition, since the mixed fuel in the fuel supplying pipe 60 is released into the fuel tank 60 via the return pipe 82, the pressure of the mixed fuel in the fuel supplying pipe 60 is lowered and the one end of the return pipe 82 is closed again by the bellowphragm. Thus, the bellowphragm 74 cooperates with the one end of the return pipe 82 to function as a pressure regulating valve and the pressure of the mixed fuel in the fuel supplying pipe 60 is determined by the urging force of the compression coil spring 84.

An exhaust passage 86 also extends from the combustion chamber 16 of the engine in addition to the intake passage 18. The exhaust passage 86 includes an internal passage 88 in the cylinder head 12, first exhaust pipe 90, catalyst unit 92, second exhaust pipe 94 and muffler 96 arranged in this order as viewed from the combustion chamber 16. In an example shown in the drawing, the interior of the first exhaust pipe 90 is divided into two passages, and an oxygen sensor 98 is arranged in one of the two passages. The oxygen sensor 98 detects the concentration of oxygen contained in the exhaust gas flowing in the exhaust pipe 86 and supplies a detection signal to the control unit 42.

Inlet and outlet valves for opening and closing the inlet port and outlet port of the combustion chamber 16 are provided. The inlet port is communicated with the intake passage 18. On the other hand, the outlet port is communicated with the exhaust passage 86. The functions of the inlet and outlet valves are well known in the art and therefore they are shown in the drawing and no explanation is made for them here. Of course, an ignition plug or plugs are disposed in the combustion chamber 16, but no ignition plug is shown for simplifying the drawing.

The control unit 42 is supplied with detection signals from various sensors described before and may also be supplied with detection signals from sensors other than the sensors described before. For example, the other sensors include a crank angle sensor 100 for outputting a pulse signal each time the crank of the engine 10 is rotated by a unit angle, a top dead center sensor 102 for detecting a reference crank angle of the first cylinder of the engine 10, that is, the top dead center of the piston 14 of the first cylinder, and a voltage sensor 104 for detecting the voltage of a battery of the engine 10.

Next, the control unit 42 is explained. The control unit 42 is roughly divided into an input/output circuit 106, data processing circuit 108, memory circuit 110 and driving circuit 112. The input/output circuit 106 is supplied with detection signals from the various sensors described before and supplies data corresponding to the detection signals to the data processing circuit 108. The operation processing circuit 108 processes data according to a control program previously stored in the memory circuit 110 and supplies a control signal or driving signal corresponding to the result to the idling speed control valve 48, fuel injector 56, ignition plug and the like which are to be controlled via the input/output circuit 106 and driving circuit 112.

In the above control program, a detection routine for detecting the blending ratio of the mixed fuel, a control routine for receiving the result of execution of the detection program and controlling the opening period and opening timing of the idling speed controlling valve 48 of the fuel injector 56, for example, are contained.

Figure 2:
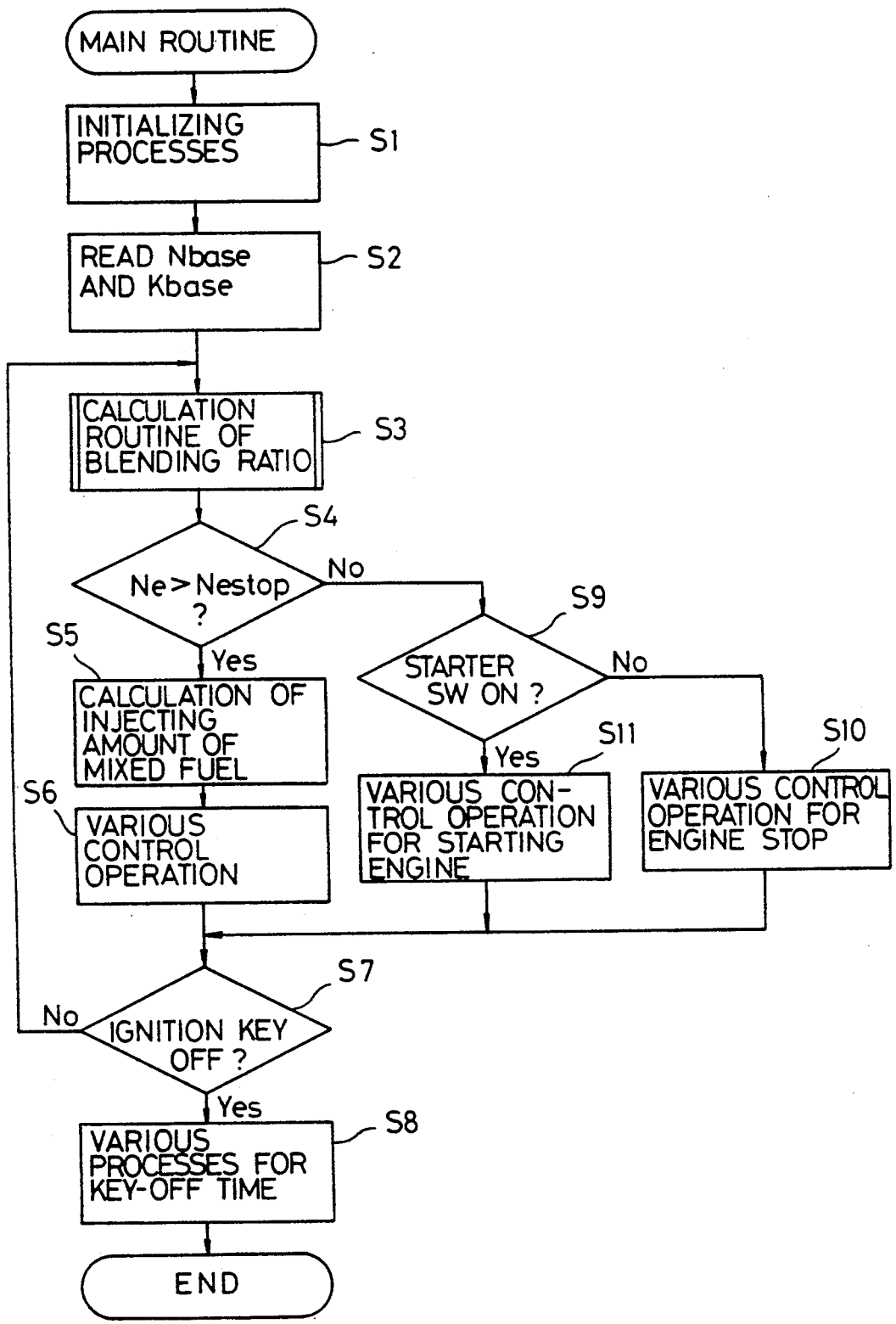
FIG. 2 is a flowchart showing the main routine effected by a control unit in the internal combustion engine.

The above detection routine and control routine are indicated as a main routine of FIG. 2 and the explanation is made below along the main routine of FIG. 2.

First, when the ignition key of the engine 10 is turned on, the control unit 42 and the various sensors described before start the operations thereof, and the control unit 42 receives detection signals from the various sensors and executes the main routine.

MAIN ROUTINE

In the step S1 of the main routine, various initializing processes are effected, and in the next step S2, basic dead time Nbase and basic time constant Kbase are read out from the memory circuit 110. The basic dead time Nbase and basic time constant Kbase are constants determined according to the type of the engine 10. More concretely, the constants indicate basic values for compensating for a difference between the blending ratio Bn of the mixed fuel actually injected from the fuel injector 56 and the blending ratio Bs of the mixed fuel detected by the blending ratio sensor 66, due to the capacity of a portion of the fuel supplying pipe 60 between the fuel injector 56 and the blending ratio sensor 66. Therefore, the basic dead time Nbase and basic time constant Kbase are previously stored in a nonvolatile memory of the memory circuit 110.

In the next step S3, a calculation routine for the blending ratio is effected. In the calculation routine, an estimated blending ratio B(t) in the current cycle is calculated based on the basic dead time Nbase, basic time constant Kbase, various correction coefficients and estimated blending ratio B(t−1) calculated by effecting the preceding operation routine. The process of the calculation routine for the estimated blending ratio B(t) will be described in detail later, and the estimated blending ratio B(t−1) obtained in the preceding cycle is stored in a work memory of the memory circuit 110 in order to derive the estimated blending ratio B(t) in the current cycle.

When the estimated blending ratio B(t) is calculated in the step S3, it is determined in the step S4 whether the engine rotation speed Ne is higher than the minimum rotation speed Nestop. In this case, the engine rotation speed Ne can be obtained by counting detection signals from the crank angle sensor 100 in the control unit 42. The minimum rotation speed Nestop indicates a minimum rotation speed when the engine 10 is driven by its own force.

If the determination result in the step S4 is "YES", it is determined that the engine 10 is driven by its own force and an injection amount of the mixed fuel is calculated in the step S5. At this time, the injection amount of the mixed fuel is calculated by taking various correction coefficients into consideration as well as the estimated blending ratio B(t) obtained in the step S3. Specifically, the injection amount of the mixed fuel is derived as driving time Tinj indicating the opening period of the fuel injector 56. When the driving time Tinj is derived, basic driving time Tb for a preset intake amount A/N(n) is first calculated. The basic driving time Tb can be expressed by the following equation.

$$Tb = A/N(n) * Kx * Kb$$

where A/N(n) indicates an amount of air introduced into the combustion chamber 16 for each injection cycle when the mixed fuel is injected from the fuel injector 56.

Kx indicates a coefficient for deriving the driving time to supply an optimum amount of fuel so as to attain the theoretical air/fuel ratio for A/N(n), if the fuel contains only gasoline.

Kb indicates a correction coefficient of the mixed fuel obtained based on the estimated blending ratio B(t). That is, in a case where the fuel of the engine 10 includes only gasoline, the correction coefficient Kb can be expressed by the following equation by using the estimated blending ratio B(t).

$$Kb = f(B(t))$$

Figure 3:
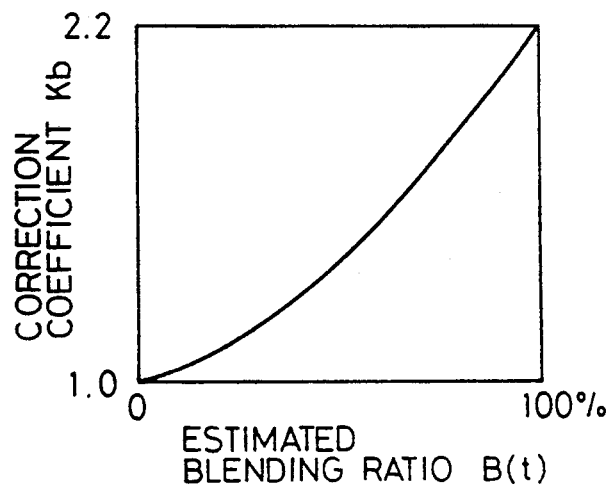
FIG. 3 is a map showing a relationship between an estimated blending ratio B(t) and a correction coefficient Kb.

Therefore, the correction coefficient Kb indicates a value for increasing the injection amount of mixed fuel containing methanol and gasoline relative to the fuel containing only gasoline. FIG. 3 shows a relationship between the estimated blending ratio B(t) and correction coefficient Kb.

Next, the basic driving time Tb is corrected by use of various correction coefficients and the driving time Tinj is derived as shown by the following equation.

$$Tinj = Tb * Kfb * Kt * Kp * Kwt * Kac$$

where Kfb is a correction coefficient for feedback control, Kt is a correction coefficient for atmospheric temperature, Kp is a correction coefficient for atmospheric pressure, Kwt is a correction coefficient for water temperature, and Kac is a correction coefficient for acceleration.

When the driving time Tinj of the fuel injector 56 is derived in the above-described manner, the driving routine (not shown) of the fuel injector 56 is effected at a time of preset interrupt while the main routine is being executed, and a driving signal is output from the driving circuit 112 of the control unit 42 to the fuel injector 56 for a period of the driving time Tinj, thereby causing the mixed fuel to be injected from the fuel injector 56 into the combustion chamber 16 of the engine 10.

After this, in the step S6, various control operations other than the control operation for the injection amount of the mixed fuel are effected. For example, the ignition timing control operation described before is effected as one of the control operations.

In the next step S7, it is checked whether the ignition key is set in the off position or not. If the determination result is "NO", the step S3 is effected and the succeeding steps are effected again. In contrast, if the determination result in the step S7 is "YES", that is, if the ignition key is set in the off position, various processes required at the key-off time are effected in the next step S8 and then the main routine is completed. For example, in the step S8, the history of the estimated blending ratio B(t) derived each time the step S3 is effected is stored into the nonvolatile memory of the memory circuit 110 as one of the processes.

If the determination result in the step S4 is "NO", it is determined that the engine 10 is not yet driven by its own force and the step S9 is effected. In the step S9, it is checked whether the switch of the starter motor of the engine 10, that is, the starter switch is set in the on position or not. If the determination result is "NO", the step S7 is effected after the step S10 is effected. Since the engine 10 is still stopped irrespective of whether it is driven by its own force or by an external force when the step S10 is effected, various control operations are effected in the step S10 while the engine 10 is stopped. For example, an operation of storing various learned values into the back-up memory to simplify the next starting of engine 10 is effected as one of the control operations in the step 10.

After this, the determination result in the step S7 is always "NO" if the ignition key is set in the on position, and therefore the steps S3, S4, S9, S10 and S7 are repeatedly effected until the determination result in the step S9 becomes "YES".

If the determination result in the step S9 becomes "YES", the step S11 is effected, and in this step, various control operations necessary for starting the engine 10 are effected. For example, an operation of inputting a fixed value as a reference value for the fuel ignition control is effected as one of the control operations.

When the steps following the step S3 are effected again after the step S11 is effected, the determination result in the step S4 becomes "YES" so that the routine for effecting the step S5 and the succeeding steps described before is repeatedly effected until the ignition key is set into the off position.

Figure 4:
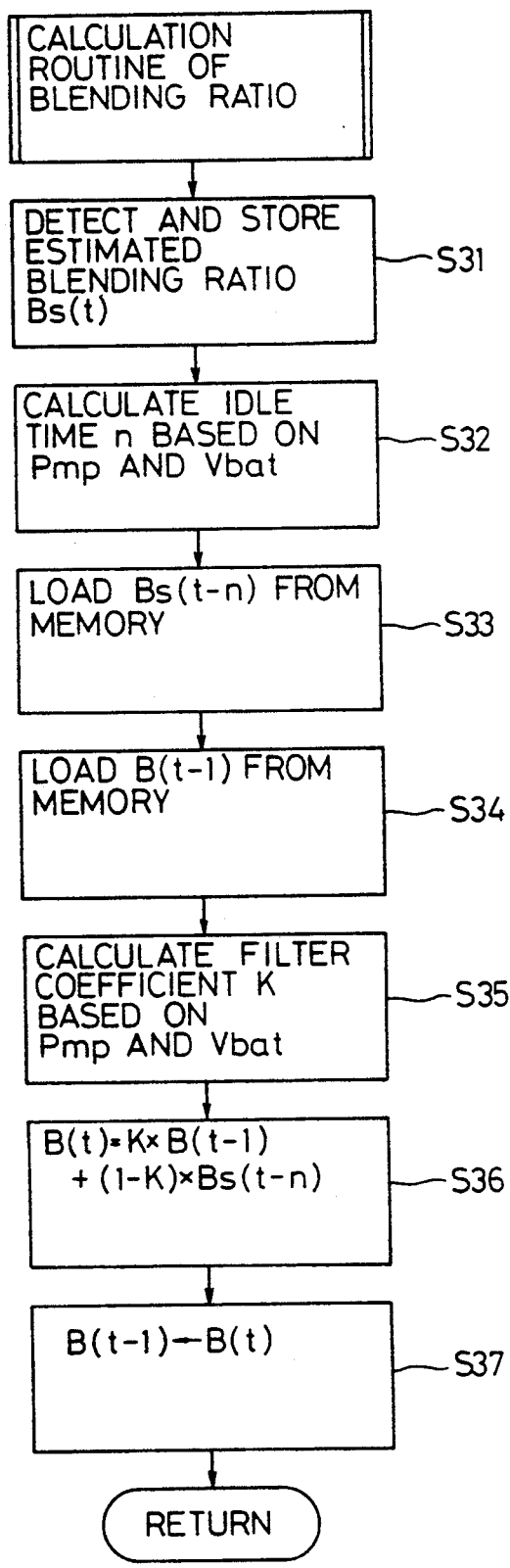
FIG. 4 is a flowchart showing a calculation routine for deriving the estimated blending ratio.

A detailed explanation of the calculation routine for deriving an estimated blending ratio in the step S3 is shown in FIG. 4, and the calculation routine is explained below. The calculation routine is repeatedly effected in a preset period until the completing condition of the main routine is satisfied.

CALCULATION ROUTINE OF ESTIMATED BLENDING RATIO

First, in the step S31, a blending ratio Bs(t) obtained based on the detection signal from the blending ratio sensor 66 is stored into the work memory of the memory circuit 110. In this case, the blending ratio Bs(t) is sequentially stored into the work memory each time the calculation routine or the step S31 is repeatedly effected. That is, the work memory has an area for holding (n+1) values of the blending ratio Bs. In this case, n is an integer. Therefore, the history of the blending ratios Bs including the blending ratio Bs(t) in the current cycle and the blending ratios Bs(t−1), Bs(t−2), ... and Bs(t−n) in the preceding n cycles is stored in the work memory.

Figure 5:
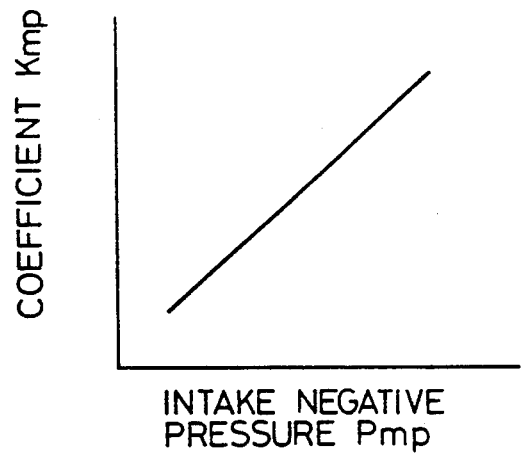
FIG. 5 is a map showing a correction coefficient Kmp for intake negative pressure.
Figure 6:
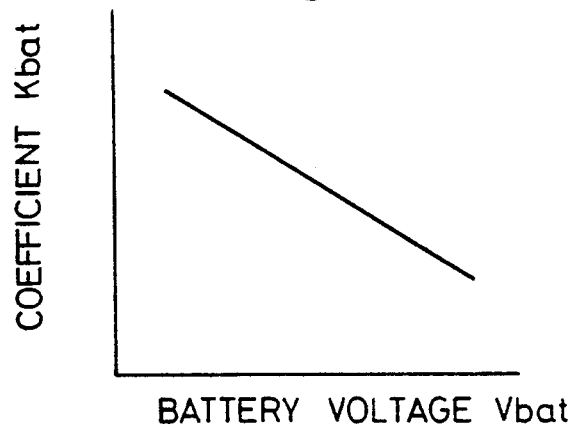
FIG. 6 is a map showing a correction coefficient Kbat for a battery voltage.

The integer n indicates a first delay coefficient corresponding to time required for the mixed fuel which has passed through the blending ratio sensor 66 to be actually injected from the fuel injector 56, that is, idle time required for moving the mixed fuel due to the capacity of portions of the fuel supplying pipe 60 and branch pipe 58 between the blending ratio sensor 66 and the fuel injector 56, and the idle time n is determined in the next step S32. In this step, the intake negative pressure Pmp derived from the detection signal of the boost sensor 50 and the battery voltage Vbat derived from the detection signal of the voltage sensor 104 are first read out, and the idle time n is derived based on the intake negative pressure Pmp, battery voltage Vbat and basic idle time Nbase. In the deriving process of the idle time n, a correction coefficient Kmp is first read out from the map shown in FIG. 5, based on the intake negative pressure Pmp, and the correction coefficient Kmp is stored into a preset area of the work memory. Further, a correction coefficient Kbat is derived from the map of FIG. 6, based on the battery voltage Vbat in the same manner as described above, and the correction coefficient Kbat is also stored into a preset area of the work memory. The maps of FIGS. 5 and 6 are previously stored in the nonvolatile memory of the memory circuit 110.

If the correction coefficients Kmp and Kbat are derived, then the idle time n is derived from the following equation.

$$n = Kmp * Kbat * Nbase \qquad (1)$$

In this case, the maximum value nMAX is set for the idle time n, and therefore, when the idle time n derived from the equation (1) will become larger than the maximum value nMAX, that is, n>nMAX, the idle time n is set to nMAX.

In the next step S33, the blending ratio Bs obtained from the blending ratio sensor 66 in a cycle which was effected n cycles before the current cycle, that is, the blending ratio $Bs(t-n)$ is read out from the work memory. Then, in the next step S34, the blending ratio $Bs(t-1)$ obtained in the calculation routine of the preceding cycle is read out from the work memory.

Figure 7:
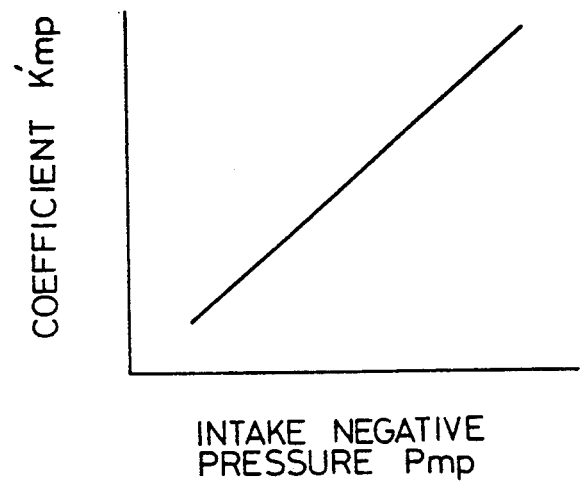
FIG. 7 is a map showing a correction coefficient K'mp for intake negative pressure.
Figure 8:
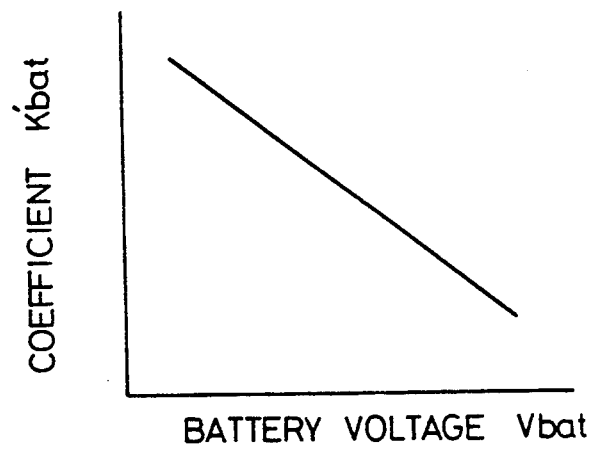
FIG. 8 is a map showing a correction coefficient K'bat for a battery voltage.

After this, in the step S35, a filter coefficient k as a second delay variable is calculated based on the intake negative pressure PMP, battery voltage Vbat and basic time constant Kbase obtained in the step S32. The filter coefficient k is mainly determined according to the intake amount of the engine 10, and more specifically, the correction coefficient K'mp is first derived from the map of FIG. 7 based on the intake negative pressure Pmp and then a correction coefficient K'BAT is derived from the map of FIG. 8 based on the battery voltage Vbat. The correction coefficients K'mp and K'bat are also stored into preset areas of the work memory. Of course, the maps of FIGS. 7 and 8 are previously stored in the nonvolatile memory of the memory circuit 110.

When the correction coefficients K'mp and K'bat are obtained, the filter coefficient k is derived by the following equation.

$$k = K'mp * K'bat * Kbase \qquad (2)$$

where k takes a value in the range of $1 \geq k \geq 0$.

In the next step S36, the estimated blending ratio $B(t)$ in the current cycle is derived by the following equation based on the idle time n, blending ratio $Bs(t-n)$, estimated blending ratio $B(t-1)$ and filter coefficient k respectively obtained in the former steps S32, S33, S34 and S35.

$$B(t) = k * B(t-1) + (1-k) * Bs(t-n) \qquad (3)$$

As is clearly understood from the above equation, the estimated blending ratio $Bs(t)$ derived in the current cycle takes a value obtained by adding the blending ratio $B(t-1)$ obtained in the preceding cycle and the blending ratio $Bs(t-n)$ obtained by use of the blending ratio sensor 66 in a cycle which was effected n cycles before the current cycle to each other at a rate determined by the filter coefficient k. Therefore, as the filter coefficient k becomes larger, the rate of the estimated blending ratio $B(t-1)$ obtained in the preceding cycle and included in the estimated blending ratio $B(t)$ of the current cycle becomes larger. In contrast, as the filter coefficient k becomes smaller, the rate of the blending ratio $Bs(t-n)$ obtained in a cycle which was effected n cycles before the current cycle and included in the estimated blending ratio $B(t)$ of the current cycle becomes larger.

After this, in the step S37, the value of the estimated blending ratio $B(t-1)$ derived in the preceding cycle is replaced by the value of the estimated blending ratio $B(t)$ derived in the current cycle, and the estimated blending ratio $B(t)$ of the current cycle is used to control the injection amount of mixed fuel, ignition timing and the like in the main routine described before.

Figure 9:
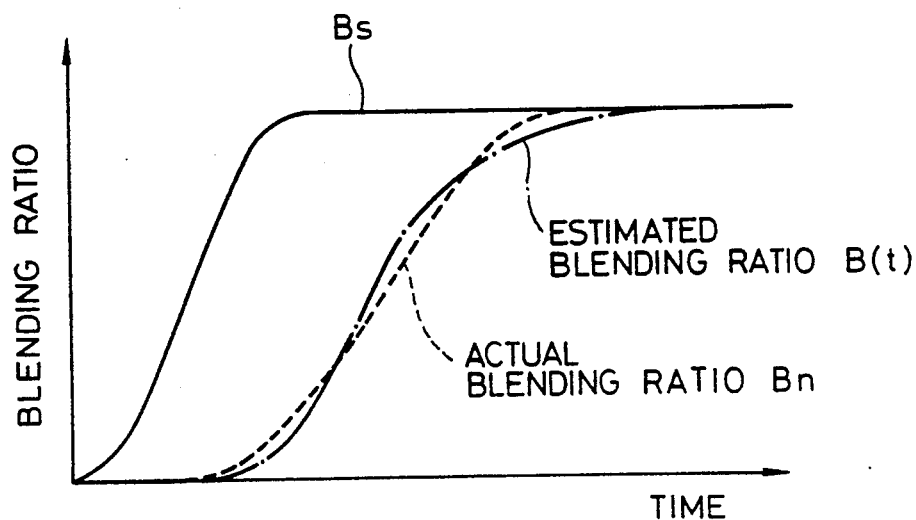
FIG. 9 is a graph showing an estimated blending ratio derived according to the method of this invention and a blending ratio of the mixed fuel injected from a fuel injector.

As described above, according to the method of detecting the blending ratio of the mixed fuel in this invention, the idle time n and filter coefficient k are calculated according to the operating condition of the engine 10, and then the estimated blending ratio $B(t)$ of the current cycle is derived based on the estimated blending ratio $B(t-1)$ obtained in the preceding cycle and the blending ratio $Bs(t-n)$ obtained in a cycle which was effected n cycles before the current cycle by use of the idle time n and filter coefficient k. As a result, the estimated blending ratio $B(t)$ thus calculated takes a value obtained by correctly compensating for a difference between the blending ratio Bs of the mixed fuel detected by the blending ratio sensor 66 and the blending ratio of the mixed fuel actually injected from the fuel injector 56 caused by a capacity between the blending ratio sensor 66 and the fuel injector 56 in the fuel supplying pipe 60. This is clearly understood by referring to FIG. 9. In FIG. 9, the estimated blending ratio $B(t)$ is shown by a one-dot-dash line and the actual blending ratio Bn of the mixed fuel injected from the fuel injector 56 is shown by broken lines. It is clearly understood by comparing the one-dot-dash line and broken lines that the estimated blending ratio $B(t)$ substantially coincides with the actual blending ratio Bn. In FIG. 9, a solid line indicates the blending ratio Bs obtained from the blending ratio sensor 66. As a result, the output control of the engine 10 can be correctly effected by controlling the amount of the mixed fuel injected from the fuel injector 56 and the ignition timing, based on the estimated blending ratio $B(t)$ derived by use of the detection method of this invention.

Figure 10:
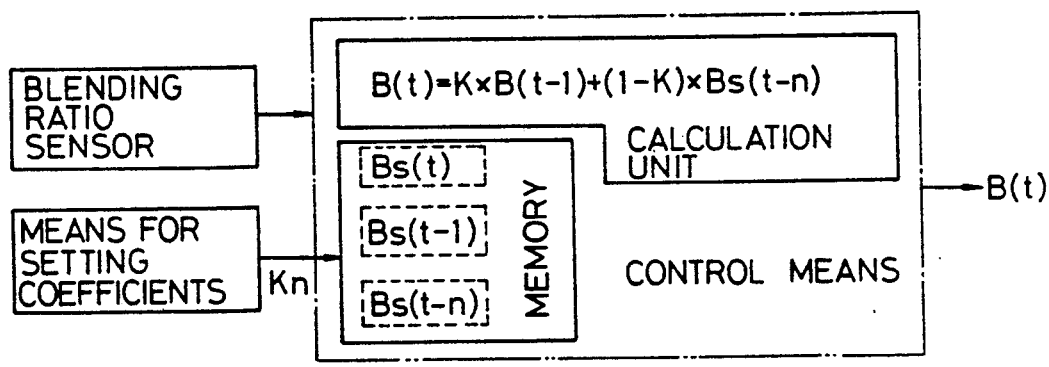
FIG. 10 is a block diagram schematically showing the detection method of this invention.

FIG. 10 is a block diagram schematically showing the detection method of this invention and the procedure for deriving the estimated blending ratio $B(t)$ is clearly understood from the block diagram. In this case, the means for setting the coefficients and control means are attained by the control unit 42 of FIG. 1.

This invention is not limited to the above embodiment and various modifications can be made. For example, in the above embodiment, the idle time n and filter coefficient k are changed according to the operating condition of the engine 10, but it is possible to set the idle time n and filter coefficient k as constants. In this case, the steps S32 and S35 can be omitted in the calculation routine of FIG. 4 for deriving the estimated blending ratio.

Further, in a case where the blending ratio sensor 66 is disposed in position sufficiently near the fuel injector 56, the idle time n can be set to 0, that is, n=0 can be set. In this case, the estimated blending ratio B(t) is derived by the following equation.

$$B(t) = k*B(t-1) + (1-k)*Bs(t) \qquad (4)$$

When the estimated blending ratio B(t) is derived by use of the above equation, it is not necessary to store the history of the blending ratio Bs(t) obtained by use of the blending ratio sensor 66 into the memory of the memory circuit 110 of the control unit 42, thereby making it possible to reduce the capacity of the memory.

In the above embodiment, the idle time n is represented by the number of execution of the calculation routine, but instead, it is also possible to represent the idle time by use of the number of preset pulse signals generated from the crank angle sensor 100. Further, it can be represented by time measured by a timer disposed in the control unit 42.

Further, in the above embodiment, the explanation is made with reference to one cylinder, but it should be noted that when the detection method of this invention is applied to another cylinder, the values of the basic idle time and basic time constant may vary according to a difference in the capacity between the fuel injector and the blending ratio sensor of the corresponding cylinder.

What is claimed is:

1. A method for controlling operation of an internal combustion engine based on an estimated ratio of a mixed fuel to be supplied to a combustion chamber of the internal combustion engine, said internal combustion engine including a fuel supplying passage and a blending ratio sensor disposed in said fuel supplying passage, said method comprising:

setting a delay coefficient k according to an operation parameter and a type of said internal combustion engine;

detecting the blending ratio Bs(t) of the mixed fuel passing said blending ratio sensor during each cycle of said internal combustion engine;

calculating the estimated blending ratio B(t) according to the equation:

$$B(t) = k*B(t-1) + (1-k)*Bs(t),$$

where t is an integer, and B (t−1) is an estimated blended ratio derived in a preceding cycle of said internal combustion engine; and controlling at least one of a fuel injection operation and ignition timing control operation of said internal combustion engine, as a function of said estimated blending ratio B(t).

2. A method for controlling operation of an internal combustion engine based on an estimated ratio of a mixed fuel to be supplied to a combustion chamber of the internal combustion engine, said internal combustion engine including a fuel supplying passage and a blending ratio sensor disposed in said fuel supplying passage, said method comprising:

setting first delay coefficient n according to an operation parameter and a type of said internal combustion engine;

setting second delay coefficient k according to an operation parameter and the type of said internal combustion engine;

detecting the blending ratio Bs(t) of the mixed fuel passing said blending ratio sensor during each cycle of said internal combustion engine;

calculating the estimated blending ratio B(t) according to the equation:

$$B(t) = k*B(t-1) + (1-k)*Bs(t-n),$$

wherein t is an integer, B(t−1) is an estimated blending ratio derived in a preceding cycle of said internal combustion engine, and Bs(t−n) is a blending ratio detected by said blending ratio sensor in a cycle effected n cycles before a current cycle; and controlling at least one of a fuel injection operation and ignition timing control operation of said internal combustion engine, as a function of said estimated blending ratio B(t).

3. A method according to claim 2, further comprising a step of calculating the estimated blending ratio B(t) in a preset period, and wherein the first delay coefficient n is represented by a preset number of operation periods used for deriving the estimated blending ratio B(t), the preset number being set based on a traveling distance of the mixed fuel between said blending ratio sensor and a fuel injector disposed near said combustion chamber in said internal combustion engine.

4. A method according to claim 2, further comprising a step of detecting by means of a rotation sensor the number of revolutions of said engine, based on a preset number of pulse signals from said rotation sensor for each unit time, and wherein the first delay coefficient n is represented by a pulse number of signals generated from said rotation sensor, the pulse number being set based on the traveling distance of the mixed fuel between said blending ratio sensor and a fuel injector disposed near said combustion chamber in said internal combustion engine.

5. A method according to claim 2, comprising representing the first delay coefficient n by a preset time which is set based on a traveling distance of the mixed fuel between said blending ratio sensor and a fuel injector disposed near said combustion chamber in said internal combustion engine.

6. A method according to claim 2, comprising representing the first delay coefficient n by a delay in supply of the mixed fuel caused by a flow amount of the mixed fuel and a capacity of said fuel supply passage between said fuel injector and said blending ratio sensor, and wherein the second delay coefficient k is represented by a coefficient set according to an intake amount of said engine.

7. A method according to claim 6, comprising respectively calculating the first delay coefficient n and second delay coefficient k according to the following equations:

$$n = Kmp*Kbat*Nbase$$

$$k = K'mp*K'bat*Kbase$$

where Kmp and K'mp are correction coefficients for an intake negative pressure of an intake air of said engine, Kbat and K'bat are correction coefficients for a battery voltage of said engine, Nbase is a fixed value determined by the type of said engine, and Kbase is a fixed value determined by the type of said engine.

8. A method according to claim 7, comprising setting Nbase and Kbase based on a capacity of said fuel supply passage between said fuel injector and said blending ratio sensor. z

* * * * *